United States Patent
Xu et al.

(10) Patent No.: US 12,349,226 B2
(45) Date of Patent: Jul. 1, 2025

(54) ELECTRONIC DEVICE AND METHOD AND COMPUTER-READABLE STORAGE MEDIUM FOR DETERMINING A BEAM FAILURE EVENT OF A MULTIPLE TRANSCEIVING AND RECEIVING POINT (MULTI-TRP) WIRELESS COMMUNICATION

(71) Applicant: Sony Group Corporation, Tokyo (JP)

(72) Inventors: Jin Xu, Beijing (CN); Ying Zhou, Beijing (CN); Xinli Wang, Beijing (CN); Wenjing Ren, Beijing (CN); Xiaofeng Tao, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 328 days.

(21) Appl. No.: 17/916,810

(22) PCT Filed: May 6, 2021

(86) PCT No.: PCT/CN2021/091848
§ 371 (c)(1),
(2) Date: Oct. 4, 2022

(87) PCT Pub. No.: WO2021/227914
PCT Pub. Date: Nov. 18, 2021

(65) Prior Publication Data
US 2023/0164863 A1     May 25, 2023

(30) Foreign Application Priority Data
May 11, 2020 (CN) .......................... 202010392038.3

(51) Int. Cl.
*H04W 76/19*      (2018.01)
*H04L 1/20*      (2006.01)

(52) U.S. Cl.
CPC ............. *H04W 76/19* (2018.02); *H04L 1/203* (2013.01)

(58) Field of Classification Search
CPC . H04W 76/19; H04W 36/0033; H04W 24/04; H04W 72/04; H04W 7/0628;
(Continued)

(56) References Cited

U.S. PATENT DOCUMENTS

2019/0052344 A1*   2/2019   Kundargi ............... H04B 17/24
2019/0215048 A1    7/2019   Cirik
(Continued)

FOREIGN PATENT DOCUMENTS

CN    110504998 A    11/2019
CN    110896546 A    3/2020
(Continued)

OTHER PUBLICATIONS

International Search Report and Written Opinion mailed on Aug. 4, 2021, received for PCT Application PCT/CN2021/091848, filed on May 6, 2021, 11 pages including English Translation.
(Continued)

*Primary Examiner* — Mewale A Ambaye
(74) *Attorney, Agent, or Firm* — XSENSUS LLP

(57) ABSTRACT

An electronic device that includes a processing circuit that obtains, from a base station, configuration information used for beam failure recovery of a user equipment in multiple transmission/reception points (TRPs). Here, the configuration information includes a first configuration or a second configuration, the first configuration being used for determination of a beam failure event of each of the multiple TRPs, and the second configuration being used for joint determination of beam failure events of the multiple TRPs.

(Continued)

The processing circuit of the electronic device reports the beam failure event to the base station on the basis of the configuration information.

17 Claims, 10 Drawing Sheets

(58) Field of Classification Search
CPC ..... H04L 1/203; H04B 7/0695; H04B 7/0247; H04B 7/088; H04B 7/063
See application file for complete search history.

(56) References Cited

U.S. PATENT DOCUMENTS

| | | | |
|---|---|---|---|
| 2019/0281480 A1 | 9/2019 | Wei | |
| 2020/0350972 A1* | 11/2020 | Yi | H04L 5/0051 |
| 2022/0061117 A1* | 2/2022 | Liou | H04W 76/19 |
| 2022/0104036 A1* | 3/2022 | Zhou | H04B 7/088 |

FOREIGN PATENT DOCUMENTS

| | | |
|---|---|---|
| EP | 3535857 A1 | 9/2019 |
| GB | 2575691 A | 1/2020 |
| JP | 2020526086 A | 8/2020 |
| WO | WO-2018230862 A1 | 12/2018 |
| WO | WO-2019170159 A1 | 9/2019 |
| WO | WO-2019218936 A1 | 11/2019 |
| WO | WO-2019246084 A1 | 12/2019 |
| WO | WO-2020012619 A1 | 1/2020 |
| WO | WO-2020032685 A1 | 2/2020 |

OTHER PUBLICATIONS

Huawei et al., "Remaining issues on multi-beam enhancements in R16", 3GPP TSG RAN WG1 Meeting #100-e, R1-2000203, Feb. 24-Mar. 6, 2020, 8 pages.

LG Electronics, "Enhancements on multi-TRP/panel transmission", 3GPP TSG RAN WG1 Meeting #99, R1-1912269, Nov. 18-22, 2019, pp. 1-16.

Xiaomi, "Enhancements on beam management", 3GPP TSG RAN WG1 #99, R1-1912995, Renu, USA, Nov. 18-22, 2019, pp. 1-5.

ZTE, "Considerations on beam management for multi-TRP", 3GPP TSG RAN WG1 #97, R1-1906244, Reno, USA, May 13-17, 2019, pp. 1-9.

Samsung, "Trigger condition for beam failure recovery", 3GPP TSG RAN WG1 Meeting #88, R1-1702939, Athens, Greece Feb. 13-17, 2017, pp. 1-4.

Sony, "Considerations on beam management for multi-TRP", 3GPP TSG RAN WG1 #103e, R1-2008349, E-meeting, Oct. 26-Nov. 13, 2020, pp. 1-7.

\* cited by examiner

ELECTRONIC DEVICE AND METHOD AND COMPUTER-READABLE STORAGE MEDIUM FOR DETERMINING A BEAM FAILURE EVENT OF A MULTIPLE TRANSCEIVING AND RECEIVING POINT (MULTI-TRP) WIRELESS COMMUNICATION

CROSS-REFERENCE TO RELATED APPLICATIONS

The present application is based on PCT filing PCT/CN2021/091848, filed May 6, 2021, which claims priority to Chinese Patent Application No. 202010392038.3, titled "ELECTRONIC DEVICE AND METHOD FOR WIRELESS COMMUNICATION, AND COMPUTER-READABLE STORAGE MEDIUM", filed on May 11, 2020 with the China National Intellectual Property Administration, each of which is incorporated herein by reference in its entirety.

FIELD

The present disclosure relates to the technical field of wireless communications, and in particular to a beam failure recovery mechanism. More particularly, the present disclosure relates to an electronic apparatus and a method for wireless communications, and a computer-readable storage medium.

BACKGROUND

In the beam failure recovery (BFR) procedure in Rel-15, a set $\bar{q}_0$ of periodic channel state information reference signal (CSI-RS) resource indexes for beam failure detection is defined. The set $\bar{q}_0$ includes values of indexes for up to two reference signals. Moreover, it has been agreed in the beam failure detection procedure that in a case of block error rates (BLERs) corresponding to all beam failure detection reference signals (BFD-RS) in the set $\bar{q}_0$ being greater than a threshold, the UE decides that a beam failure event has occurred. The BFR procedure in Rel-15 is for a scenario of a single transceiving and receiving point (TRP). Although the set $\bar{q}_0$ includes two BFD-RSs, directions of two beams corresponding to the reference signals are usually the same. In a case that a beam failure event occurs to one of the two beams, a beam failure event occurs to the other of the two beams.

However, in a Multi-TRP scenario, positions of multiple TRPs are different, so that directions of beams corresponding to reference signals of the multiple TRPs are different. There may be a case that a beam failure event occurs to one of the multiple TRPs, while the other TRPs operate well. In view of this, for the Multi-TRP scenario, different BFR strategies are required to be applied.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: acquire, from a base station, configuration information for beam failure recovery of user equipment in multiple Transceiving and Receiving Point (TRP) communication, wherein the configuration information comprises first configuration and/or second configuration, the first configuration is used for determination of a beam failure event of each of multiple TRPs, and the second configuration is used for joint determination of a beam failure event of the multiple TRPs; and report, based on the configuration information, the beam failure event to the base station.

According to another aspect of the present disclosure, a method for wireless communications is provided. The method includes: acquiring, from a base station, configuration information for beam failure recovery of user equipment in multi-TRP communication, wherein the configuration information comprises first configuration and/or second configuration, the first configuration is used for determination of a beam failure event of each of multiple TRPs, and the second configuration is used for joint determination of a beam failure event of the multiple TRPs; and reporting, based on the configuration information, the beam failure event to the base station.

According to another aspect of the present disclosure, an electronic apparatus for wireless communications is provided. The electronic apparatus includes processing circuitry. The processing circuitry is configured to: transmit, to user equipment, configuration information for beam failure recovery of the user equipment in multi-TRP communication, wherein the configuration information comprises first configuration and/or second configuration, the first configuration is used for determination of a beam failure event of each of multiple TRPs, and the second configuration is used for joint determination of a beam failure event of the multiple TRPs; and acquire, from the user equipment, report of the user equipment for a beam failure event based on the configuration information.

According to another aspect of the present disclosure, a method for wireless communications is provided. The method includes: transmitting, to user equipment, configuration information for beam failure recovery of the user equipment in multi-TRP communication, wherein the configuration information comprises first configuration and/or second configuration, the first configuration is used for determination of a beam failure event of each of multiple TRPs, and the second configuration is used for joint determination of a beam failure event of the multiple TRPs; and acquiring, from the user equipment, report of the user equipment for a beam failure event based on the configuration information.

According to the electronic apparatus and method in the present disclosure, a beam failure determination rule and a beam failure event notification mechanism for the multi-TRP scenario are provided, thereby better ensuring the transmission reliability and reducing latency in the multi-TRP scenario.

According to other aspects of the present disclosure, there are further provided computer program codes and computer program products for implementing the methods for wireless communications above, and a computer readable storage medium having recorded thereon the computer program codes for implementing the methods for wireless communications described above.

These and other advantages of the present disclosure will be more apparent from the following detailed description of preferred embodiments of the present disclosure in conjunction with the accompanying drawings.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below; are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a service, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
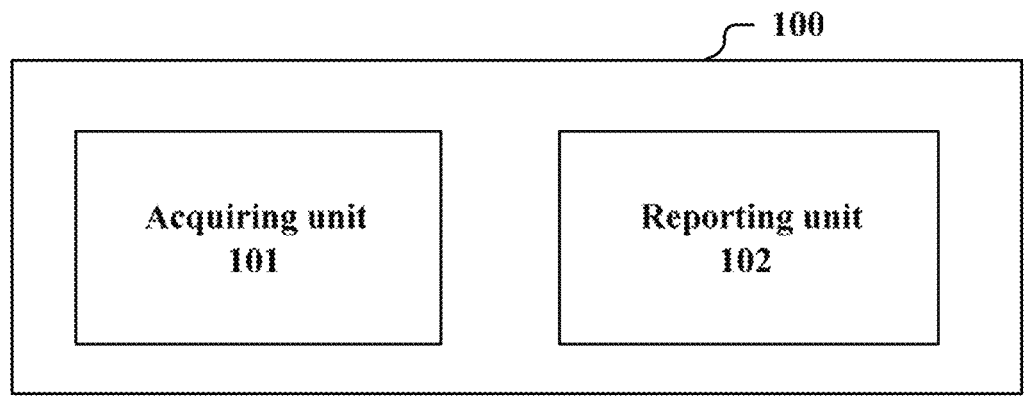
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes an acquiring unit 101 and a reporting unit 102. The acquiring unit 101 is configured to acquire, from a base station, configuration information for BFR of user equipment (UE) in multiple TRP communication. The configuration information includes first configuration and/or second configuration. The first configuration is used for determination of a beam failure event of each of multiple TRPs, and the second configuration is used for joint determination of a beam failure event of the multiple TRPs. The reporting unit 102 is configured to report, based on the configuration information, the beam failure event to the base station.

The acquiring unit 101 and the reporting unit 102 may be implemented by one or more processing circuitries. The processing circuitry may be implemented as, for example, a chip. In addition, it should be understood that various functional units in the apparatus shown in FIG. 1 are only logical modules divided based on specific functions implemented by these functional units, and are not intended to limit the specific implementations.

The electronic apparatus 100 may be arranged on the user equipment (UE) side or communicatively connected to the UE. Here it should be further noted that the electronic apparatus 100 may be implemented at a chip level or be implemented at a device level. For example, the electronic apparatus 100 may function as the user equipment itself and further include external apparatuses such as a memory and a transceiver (not shown in the drawings). The memory may be configured to store programs required for the user equipment to implement various functions and related data information. The transceiver may include one or more communication interfaces to support communications with different apparatuses (for example, a base station, other user equipment or the like). Implementations of the transceiver are not limited herein, which is also applicable to other configuration examples of the electronic apparatus arranged on the user equipment side to be described subsequently.

In addition, it should be noted that the first, the second, in the present disclosure are only for the purpose of distinguishing, and do not have any meaning of sequence.

The BFR mechanism performed on the UE side may include, for example, stages of beam failure determination, candidate beam identification, beam failure recovery request (BFRQ) transmission and beam failure recovery request response (BFRR) acquisition. In the stage of beam failure determination, the UE detects beam quality of a current service beam to determine whether a beam failure trigger condition is met. For example, a BLER of the service beam may be compared with a BLER threshold to determine whether a beam failure occurs. In the stage of candidate beam identification, a candidate beam that can serve as an alternative to the current service beam is selected from other beams. In the stage of BFRQ transmission, a BFRQ is transmitted to a base station (for example, a gNB). In the stage of BFRR acquisition, the UE monitors a response BFRR to the BFRQ from the base station within a specific time window.

Figure 2A:
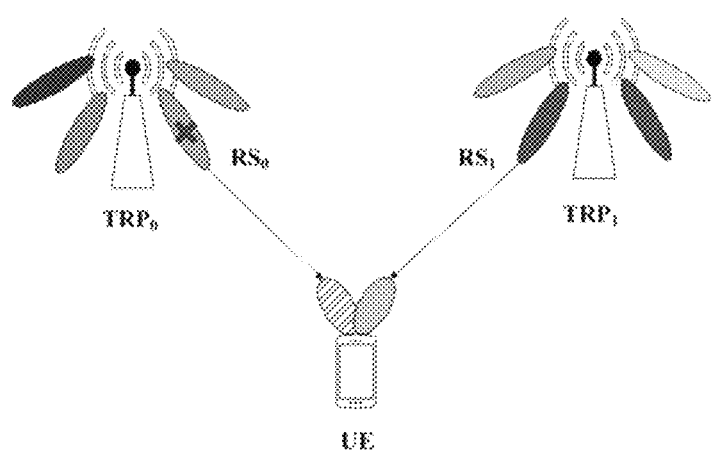
FIG. 2a and FIG. 2b show examples of cases of beam failure in a multi-TRP scenario.
Figure 2B:
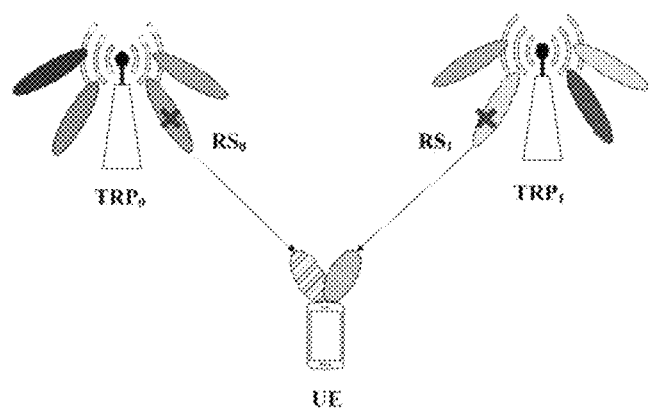

As described above, in a Multi-TRP scenario, there may be a case that a beam failure event occurs to one of the multiple TRPs, while the other TRPs operate normally. FIG. 2a and FIG. 2b show examples of cases of beam failure in a Multi-TRP scenario. In FIG. 2a, a beam failure occurs only to $TRP_0$. In FIG. 2b, beam failures occur to both $TRP_0$ and $TRP_1$.

According to the existing BFR mechanism, in a case that beam failure occurs to only one TRP, the UE does not report the beam failure event to the base station. In the Multi-TRP scenario, if the beam failure is not recovered, the performance of the UE may be influenced. Since joint transmission is performed by the multiple TRPs, there may be cases where the transmission performance of the UE is still acceptable although beam failure occurs to each of the multiple TRPs. In order to provide a BFR mechanism suitable for the Multi-TRP scenario, first configuration and second configuration are provided according to the embodiment, so as to respectively determine beam failure for each TRP and jointly determine beam failure for multiple TRPs.

The acquiring unit 101 acquires the first configuration and/or the second configuration from the base station. For example, the acquiring unit 101 may acquire configuration information via radio resource control (RRC) signaling.

Figure 3:
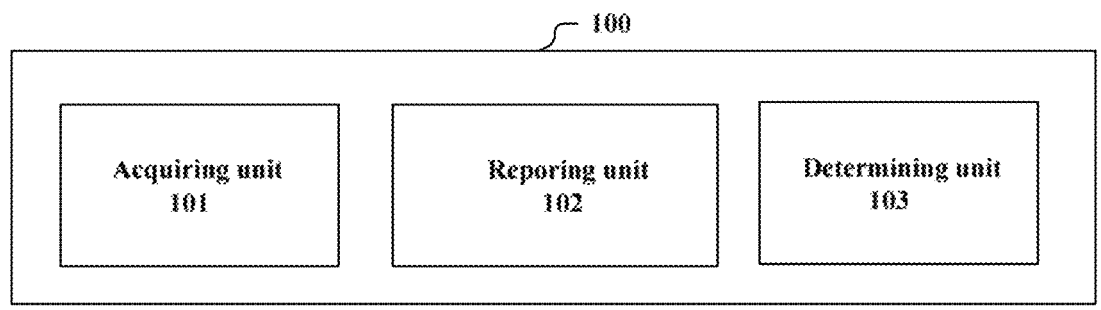
FIG. 3 is a block diagram showing functional modules of an electronic apparatus for wireless communications according to an embodiment of the present disclosure.

Examples of the first configuration and the second configuration are described in detail below: As shown in FIG. 3, the electronic apparatus 100 further includes a determining unit 103 configured to determine a beam failure event based on the configuration information. The determining unit 103 may also be implemented as a processing circuitry, for example.

For example, the first configuration includes one or more of the following: a BLER threshold for each TRP, a first counter counting the number of times of physical layer beam failure for each TRP, and a first maximum counting threshold for the first counter. The determining unit 103 is configured to, in response to the first configuration, increase, in a case that physical layer beam failure occurs to one of the multiple TRPs, the first counter of the TRP by 1; and determine, in a case that a counting value of the first counter reaches the first maximum counting threshold, that the beam failure event occurs to the TRP. The reporting unit 102 reports the beam failure event to the base station. For example, in a case that the BLER of a TRP is greater than the BLER threshold of the TRP, the determining unit 103 determines that the physical layer beam failure occurs to the TRP, that is, an instance of the beam failure event is created. The UE reports the beam failure event to its high layer. For example, the determining unit 103 may detect BLER of a beam failure detection reference signal (BFD-RS) config- ured for each TRP, as the BLER of the TRP. The detection may be performed periodically.

It may be seen that, according to the first configuration, when the beam failure event occurs to a part of the TRPs, the beam failure event is reported and a BFR procedure is triggered. Therefore, a failed beam can be recovered as soon as possible, thereby ensuring the transmission reliability. In a case that the determining unit 103 determines that the beam failure events occurs to more than one TRP, the reporting unit 102 reports the beam failure events of the more than one TRP to the base station respectively. The beam failure events for different TRPs are reported independently from each other.

For facilitate understanding, description is made below by taking a two-TRP scenario ($TRP_0$ and $TRP_1$) as an example. Each TRP is configured with one reference signal (that is, corresponding to one beam). In this example, BLER thresholds $BLER_0$ and $BLER_1$ are respectively configured for $TRP_0$ and $TRP_1$. For example, when it is detected that the BLER of $TRP_0$ is greater than $BLER_0$ at a certain time instant, it is determined that the physical layer beam failure event occurs, and the first counter of $TRP_0$ is started and increased by 1. Subsequently, once it is detected that the BLER of $TRP_0$ is greater than $BLER_0$, the first counter of $TRP_0$ is increased by 1. Similarly, when it is detected the BLER of $TRP_1$ is greater than $BLER_1$ at a certain time instant, it is determined that the physical layer beam failure event occurs, and the first counter of $TRP_1$ is started and increased by 1. Subsequently, once it is detected that the BLER of $TRP_1$ is greater than $BLER_1$, the first counter of $TRP_1$ is increased by 1. The first counters of $TRP_0$ and $TRP_1$ count independently from each other. When the counting value of the corresponding first counter exceeds the first maximum counting threshold, it is determined that the failure beam event occurs to the corresponding TRP.

The BLER thresholds of respective TRPs may be same or different. The first maximum counting thresholds of the first counters of respective TRPs may be same or different. These thresholds may be configured by the base station.

It should be understood that, according to the existing standard, two reference signals are configured for the BFD-RS set; and in the multiple TRP scenario, one reference signal may be configured for one TRP (see the above example). However, the present application is not limited thereto and is also applicable to a case that multiple reference signals are configured for one TRP. In this case, for example, when physical layer beam failure events occur to beams corresponding to all reference signals of one TRP, it is determined that the physical layer beam failure event occurs to the TRP. Specifically, a first counter is set for each TRP. When BLER values of beams corresponding to all reference signals of one TRP each is greater than a corresponding BLER threshold, it is determined that the physical layer beam failure event occurs to the TRP and the first counter of the TRP is increased by 1. If only BLER values of beams corresponding to a part of reference signals exceed the corresponding BLER threshold, the first counter of the TRP is not increased by 1. In addition, when the first counter of the TRP reaches the first maximum counting threshold, it is determined that the beam failure event occurs to the TRP.

Alternatively, the first counter may be set for each beam of each TRP; and for multiple beams of one TRP, the same BLER threshold or different BLER thresholds may be configured. When the first counter of a beam reaches the first maximum counting threshold, it is determined that the beam failure event occurs to the beam. When the first counters of all beams of a TRP each reaches the first maximum counting threshold, it is determined that the beam failure event occurs to the TRP.

Practically, a relationship between the beam failure event for each beam of the TRP and the beam failure event of the TRP may be defined in other manners. For example, an average of BLERs of beams corresponding to all reference signals of one TRP is calculated, and it is determined whether the beam failure event occurs to the TRP by taking the average BLER as the BLER of the TRP.

In another aspect, for example, the second configuration may include one or more of the following: a weighting parameter for calculating a joint BLER of multiple TRPs, a joint BLER threshold, a second counter counting the number of times of joint physical layer beam failure of the multiple TRPs, and a second maximum counting threshold for the second counter. The determining unit 103 is configured to, in response to the second configuration, increase, in a case that the joint physical layer beam failure event occurs to the multiple TRPs, the second counter by 1; and determine, in a case that a counting value of the second counter reaches the second maximum counting threshold, that the joint beam failure event occurs to the multiple TRPs. The reporting unit 102 reports the joint beam failure event to the base station. For example, when the joint BLER of the multiple TRPs is greater than the joint BLER threshold, the determining unit 103 determines that the joint physical layer beam failure occurs to the multiple TRPs, that is, an instance of the joint beam failure event is created. The UE reports the instance of the joint beam failure event to its high layer.

When the number of instances of the joint beam failure event exceeds the second maximum counting threshold, the determining unit 103 determines that the joint beam failure event occurs to the corresponding TRP. The reporting unit 102 reports the joint beam failure event to the base station to trigger the BFR procedure.

According to the second configuration, whether the beam failure event occurs is determined based on the joint BLER of multiple TRPs. In the Multi-TRP scenario, the performance of the UE is decided based on joint transmission performance of the multiple TRPs. Therefore, the beam failure determination based on the joint BLER can accurately reflect deterioration of the performance of the UE, thereby improving the reliability.

For example, the determining unit 103 may calculate a weighted sum of BLERs of all of the multiple TRPs based on the weighting parameter, and use the calculated weighted sum as the joint BLER. The weighting parameter is set for each TRP and is a constant ranging from 0 to 1. A sum of all weighting parameters is 1.

For facilitating understanding, description is made still by taking the two-TRP scenario ($TRP_0$ and $TRP_1$) as an example. Each TRP is configured with one reference signal (that is, corresponding to one beam). In this example, the joint BLER is obtained by calculating a weighted sum of BLERs of the two TRPs, and the weighting parameter may be obtained according to the second configuration. For example, the joint BLER may be calculated according to the following equation (1):

$$BLER_{joint} = w_0 BLER_0 + w_1 BLER_1 \qquad (1)$$

In which, $BLER_0$ represents BLER of $TRP_0$, $BLER_1$ represents BLER of $TRP_1$, $w_0$ and $w_1$ respectively represent weighting parameters of $TRP_0$ and $TRP_1$, and $BLER_{joint}$ represents the calculated joint BLER. When $BLER_{joint}$ is greater than the joint BLER threshold, it is determined that the joint physical layer beam failure event occurs, that is, an instance of the joint beam failure event is created. The second counter counts the number of the instances. When the counting value reaches the second maximum counting threshold, the determining unit 103 determines that the joint beam failure event has occurred.

Similarly, the embodiment may be applied to a case where one TRP is configured with multiple reference signals. In this case, for example, weighting parameters are set for multiple beams of one TRP, and a weighted sum of BLERs of all beams of all TRPs is calculated. When the finally calculated BLER exceeds the joint BLER threshold, it is determined that the physical layer beam failure event occurs, that is, an instance of the joint beam failure event is created. Practically, the same weighting parameter may be set for multiple beams of one TRP, and specific configurations are not limited herein.

The UE may operate based on one of the first configuration and the second configuration, or operate by combining the first configuration and the second configuration. In the former case, the acquiring unit 101 may acquire only information of one of the first configuration and the second configuration from the base station.

In the latter case, that is, both the first configuration and the second configuration are configured, the acquiring unit 101 may acquire information of both the first configuration and the second configuration. In other words, the acquiring unit 101 may acquire one or more of the following: a BLER threshold for each TRP, a first counter counting the number of times of physical layer beam failure for each TRP, a first maximum counting threshold for the first counter, a weighting parameter for calculating joint BLER of multiple TRPs, a joint BLER threshold, a second counter counting the number of times of physical layer beam failure for multiple TRPs, and a second maximum counting threshold for the second counter.

The determining unit 103 may be configured to: in response to the first configuration and the second configuration, increase, in a case that physical layer beam failure occurs to one of the multiple TRPs, the first counter of the TRP by 1; increase, in a case that joint physical layer beam failure occurs to the multiple TRPs, the second counter by 1; determine, in a case that a counting value of one of multiple first counters reaches the first maximum counting threshold, that a beam failure event occurs to a TRP corresponding to the first counter, and report the beam failure event to the base station; and determine, in a case that a counting value of the second counter reaches the second maximum counting threshold, that a joint beam failure event occurs to the multiple TRPs, and report the joint beam failure event to the base station. For example, when BLER of one of the multiple TRPs is greater than the BLER threshold, it is determined that the physical layer beam failure occurs to the TRP; and when the joint BLER of the multiple TRPs is greater than the joint BLER threshold, it is determined that the joint physical layer beam failure occurs to the multiple TRPs.

It may be seen that, in this case, the second counter counts the number of instances of the joint beam failure, and the multiple first counters count the number of instances of beam failure of the respective TRPs. When any counter reaches its threshold, the corresponding beam failure event is reported to the base station. That is, whether a beam failure event for a single TRP or a joint beam failure event occurs, the reporting unit 102 reports the event to the base station, to trigger the BFR procedure, thereby further improving transmission reliability and reducing latency.

Description is made below by still taking the two-TRP scenario (TRP$_0$ and TRP$_1$) as an example. Each TRP is configured with one reference signal (that is, corresponding to one beam). In this case, two first counters and one second counter are configured. The first counters count the number of instances of beam failure events of TRP$_0$ and TRP$_1$, and the second counter counts the number of instances of joint beam failure events, respectively. The three counters work independently from each other, which are indicted as Counter_0, Counter_1 and Counter_m respectively. Maximum counting thresholds corresponding to the three counters indicated as MaxCount_Num_0, MaxCount_Num_1 and MaxCount_Num_m respectively.

Figure 4:
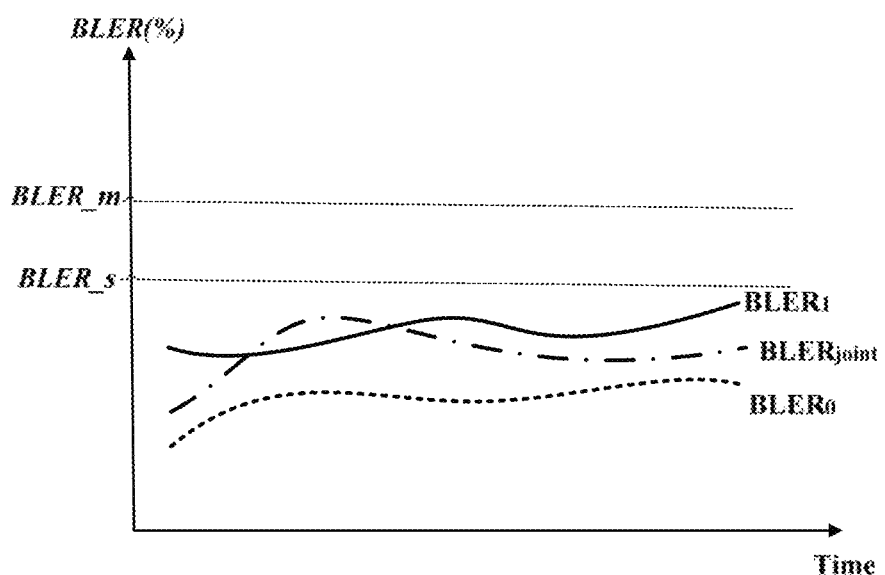
FIG. 4 shows an example in which detected BLER varies with time.

FIG. 4 shows an example in which detected BLER varies with time. In which, a lateral axis represents a time axis, a vertical axis represents the detected BLER, a dashed line represents BLER (BLER$_0$) of TRP$_0$, a solid line represents BLER (BLER$_1$) of TRP$_1$, a dot-dash line represents joint BLER (BLER$_{joint}$), BLER_m in the vertical axis represents a joint BLER threshold, and BLER_s represents BLER thresholds for TRP$_0$ and TRP$_1$. In this example, the BLER thresholds for two TRPs are same. The BLER thresholds for the two TRPs may be different, and specific setting is not limited herein.

As shown in FIG. 4, the detected BLER does not exceed a corresponding threshold, so the three counters do not start counting. In this case, the determining unit 103 determines that no beam failure event occurs, and thus the BFR procedure is not triggered.

Figure 5:
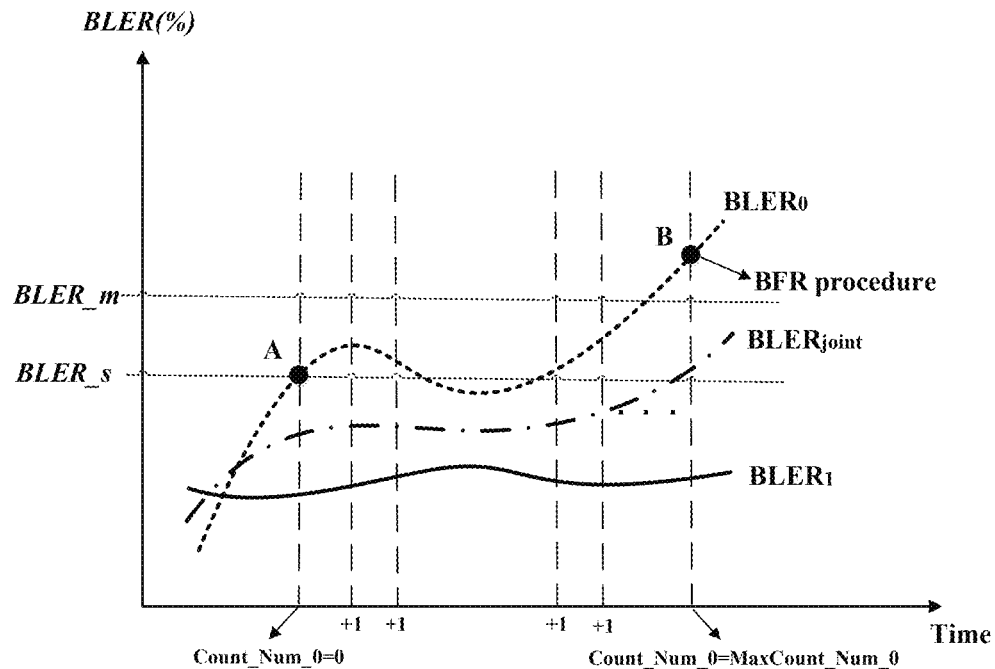
FIG. 5 shows another example in which detected BLER varies with time.

FIG. 5 shows another example in which the detected BLER varies with time. Meanings of the axes and curves are the same as those in FIG. 4, and thus are not repeated. As shown in FIG. 5, the BLER$_0$ detected at a point A exceeds the threshold BLER_s, so the physical layer beam failure occurs to TRP$_0$, and the counter Counter_0 starts counting and is increased by 1. It is assumed that a counting value of the counter Counter_0 reaches the first maximum counting threshold MaxCount_Num_0 at a point B (the Count_Num_0) in FIG. 5 represents a current value of the counter Counter_0), it is determined that the beam failure event occurs to TRP$_0$, and the BFR procedure is triggered. In the example shown by FIG. 5, the UE recovers the TRP to which the beam failure occurs as quickly as possible regardless of the joint transmission performance, so as to ensure the transmission reliability.

Figure 6:
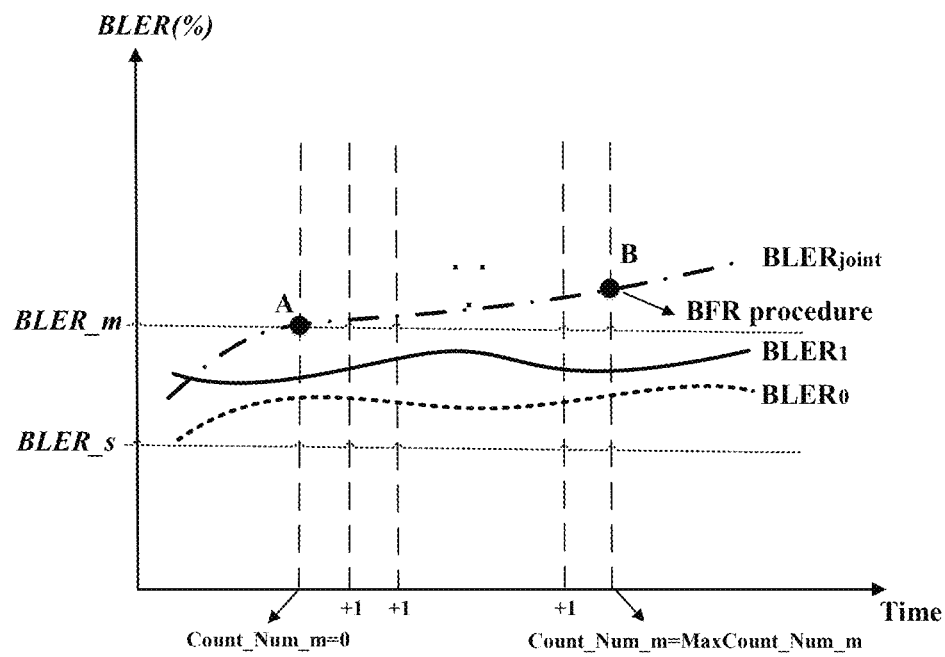
FIG. 6 shows another example in which detected BLER varies with time.

FIG. 6 shows another example in which the detected BLER varies with time. Meanings of the axes and curves are the same as those in FIG. 4, and thus are not repeated. As shown in FIG. 6, the joint BLER detected at a point A exceeds the threshold BLER_m, that is, the joint physical layer beam failure occurs, and the counter Counter_m starts counting and is increased by 1. It is assumed that a counting value of the counter Counter_m reaches the second maximum counting threshold MaxCount_Num_m at a point B, it is determined that the joint beam failure event occurs, and the BFR procedure is triggered. It should be noted that, in the example shown by FIG. 6, it is assumed that the counter Counter_m corresponding to multiple TRPs reaches the maximum counting threshold earlier than the counters Counter_0 and Counter_1 corresponding to a single TRP. Therefore, in the example shown in FIG. 6, in a case that the joint transmission performance is poor, the UE performs the BFR procedure as quickly as possible regardless of the performance of the single TRP, thereby ensuring transmission reliability.

In the 5G communication, three main transmission scenario types are defined: enhanced mobile broadband (eMBB), ultra reliable low latency communications (URLLC), and massive machine type communications (mTTC). The eMBB can provide high traffic mobile broadband service, and the URLLC can provide low latency and high reliability service. For example, in the Multi-TRP scenario, for the eMBB, different TRPs can transmit different transmission blocks to improve a transmission speed; and for the URLLC, different TRPs can transmit the same transmission block to reduce transmission latency and increase reliability.

For the eMBB, different TRPs transmit different transmission blocks. Therefore, even if the beam failure occurs to a part of the TRPs, the failed beams are expected to be recovered as quickly as possible, for example, the first configuration may be adopted. For the URLLC scenario, different TRPs transmit the same transmission block. Therefore, whether to perform the BFR can be determined based on the joint transmission performance of the multiple TRPs. In addition, if the beam failure event occurs to one TRP, the BFR is performed at once, thereby further improving the transmission reliability. Therefore, the second configuration or a combination of the first configuration and the second configuration may be adopted.

In other words, the configuration to be used by the UE for recovering the beam failure is determined according to the type of transmission scenario. In an example, the base station determines a type of the transmission scenario, and provides a corresponding configuration for recovering the beam failure to the UE based on the type of the transmission scenario. For example, in the eMBB scenario, the base station provides the first configuration to the UE. That is, the configuration information acquired by the acquiring unit 101 includes the first configuration. In the URLLC scenario, the base station provides the first configuration and the second configuration to the UE. That is, the configuration information acquired by the acquiring unit 101 includes the first configuration and the second configuration. In the URLLC scenario, the base station provides the second configuration to the UE. That is, the configuration information acquired by the acquiring unit 101 incudes the second configuration, and so on.

In another example, the configuration information further includes information indicating the type of the transmission scenario, and the type of the transmission scenario includes one of eMBB and URLLC. The determining unit 103 is configured to determine, according to the indicated type of transmission scenario, report of the beam failure event based on the first configuration and/or the second configuration. Similarly, for example, in the eMBB scenario, the beam failure event is reported based on the first configuration. In the URLLC scenario, the beam failure event is reported based on the second configuration or based on the first configuration and the second configuration.

As described above, the BFR procedure further includes identification of a new candidate beam and transmitting of BFRQ. In the embodiment, a new method for transmitting BFRQ is put forward for the Multi-TRP scenario.

For example, the reporting unit 102 is configured to report the beam failure event to the base station via the link recovery request (LRR). The LRR is a particular physical layer message and is carried by physical uplink control channel (PUCCH). The LRR is used to request uplink grant (UL grant) to a network side by the UE, so that the UE may transmit the physical uplink shared channel (PUSCH). Therefore, the LRR is the message that can be triggered by the UE at any time instant, and reporting the beam failure event by the LRR can ensure the timeliness of reporting.

In an example, the LRR may have a particular sequence format, to indicate that the beam failure event has occurred. The particular sequence format may be an all-zero sequence or all-one sequence. In this case, the reporting unit 102 is further configured to transmit, via MAC CE to the base station, information indicating to which the TRP to which the beam failure event has occurred and information of a candidate beam of the TRP to which the beam failure event has occurred. The transmitting of the BFRQ includes two steps: transmitting a particular sequence LRR indicating that the beam failure event has occurred; and transmitting MAC CE indicating information of the involved TRP and a corresponding candidate beam. The MAC CE is carried on the PUSCH resource, for example.

The TRP to which the beam failure event has occurred may be indicated by a control resource set pool index (CORESETPoolIndex). CORESETPoolIndex is a concept put forward for the Multi-TRP scenario, is configured on the control resource set, and is used for distinguishing different TRPs having the same cell ID. In the Multi-TRP scenario, an index of Scell reported in a second step of flow for BFRQ in Rel-16 is unnecessary. Therefore, these bits may be reused to transmit the CORESETPoolIndex of the TRP to which the beam failure event has occurred.

For example, in a case that the joint beam failure occurs, the reporting unit 102 may transmit a particular sequence of all-zero or all-one to the base station, and then transmit two CORESETPoolIndexes corresponding to $TRP_0$ and $TRP_1$ and information of respective candidate beams to the base station.

In another example, the LRR may include information indicating the TRP to which the beam failure event has occurred. For example, the CORESETPoolIndex may be used to indicate the TRP to which the beam failure event has occurred. The reporting unit 102 is further configured to transmit, via MAC CE to the base station, information of a candidate beam of the TRP to which the beam failure event has occurred.

It may be seen that, in this example, transmitting of BFRQ also includes two steps: transmitting information (LRR) indicating the TRP to which the beam failure event has occurred; and transmitting information (MAC CE) of a candidate beam of the involved TRP. The information indicating the TRP to which the beam failure event has occurred is transmitted via the PUCCH, and the information of the candidate beam is transmitted via the PUSCH.

For example, in a case that the beam failure event only occurs to $TRP_0$, the reporting unit 102 carries CORESETPoolIndex (for example 0) corresponding to $TRP_0$ in the LRR and transmits to the base station. Then, the reporting unit 102 carries the information of the candidate beam of $TRP_0$ on MAC CE and transmits to the base station.

In summary, according to the electronic apparatus 100 in the embodiment, the beam failure determination rule and the beam failure event notification mechanism for the Multi-TRP scenario are provided, thereby better ensuring the transmission reliability and reducing latency in the Multi-TRP scenario.

Second Embodiment

Figure 7:
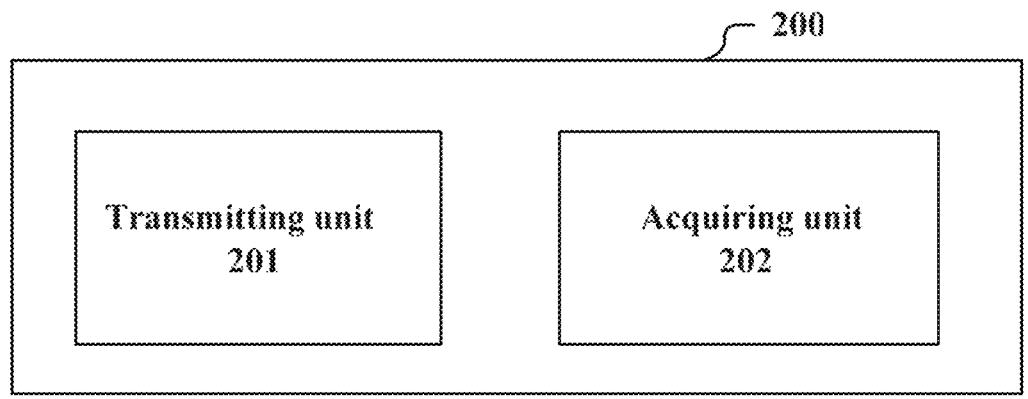
FIG. 7 is a block diagram showing functional modules of an electronic apparatus for wireless communications according to another embodiment of the present disclosure.

FIG. 7 shows a block diagram of functional modules of an electronic apparatus 200 according to another embodiment of the present disclosure. As shown in FIG. 7, the electronic apparatus 200 includes a transmitting unit 201 and an acquiring unit 202. The transmitting unit 201 is configured to transmit configuration information for beam failure recovery of UE in Multi-TRP communication to the UE. The configuration information includes first configuration and/or second configuration. The first configuration is used for determination of a beam failure event of each of multiple TRPs, and the second configuration is used for joint determination of a beam failure event of multiple TRPs. The acquiring unit 202 is configured to acquire, from the UE, report of the UE for the beam failure event based on the configuration information.

The transmitting unit 201 and the acquiring unit 202 may be implemented by one or more processing circuitry: The processing circuitry may be implemented as a chip, for example. It should be understood that, the functional units in the apparatus shown in FIG. 7 are logic modules divided according to the realized functions, and the implementation of the functional units is not limited herein.

The electronic apparatus 200 may be arranged at a base station side or may be communicatively connected to the base station. It should be noted that, the electronic apparatus 200 may be implemented at a chip level or a device level. For example, the electronic apparatus 200 may operate as the base station itself, and may include external devices such as a memory and a transceiver (not shown). The memory may be configured to store programs required for realizing various functions by the base station, and related data information. The transceiver may include one or more communication interfaces to support communication with different devices (for example, user equipment and other base stations). The implementation of the transceiver is not limited herein.

As described above, in the Multi-TRP scenario, there may be a case where the beam failure occurs to one TRP while other TRPs operate normally. According to the existing BFR mechanism, the UE does not report the beam failure event to the base station in a case that the beam failure occurs to only one TRP. In the Multi-TRP scenario, the performance of the UE may be influenced if the beam failure is not recovered. In addition, since the multiple TRPs perform joint transmission, there may be a case where the transmission performance of the UE is acceptable although the beam failure occurs to multiple TRPs. Therefore, for the Multi-TRP scenario, the first configuration and the second configuration are provided, to respectively determine beam failure for a single TRP and jointly determine beam failure for the multiple TRPs.

The transmitting unit 201 transmits the first configuration and/or the second configuration to the UE. For example, the transmitting unit 201 may transmit the information via RRC signaling, so that the UE determines the beam failure event and triggers the BFR procedure based on the first configuration and/or the second configuration.

For example, the first configuration includes one or more of the following: a BLER threshold for each TRP, a first counter counting the number of times of physical layer beam failure for each TRP, and a first maximum counting threshold for the first counter. For example, BLER thresholds for respective TRPs may be the same or different, and the first maximum counting thresholds for the first counters of respective TRPs may be the same or different.

According to the first configuration, the UE may determine and report the beam failure event for each TRP, thereby enabling execution of partial beam failures recovering. Specific operations at a UE side have been given in detail in the first embodiment, and details are not repeated herein.

For example, in a case that the beam failure events occur to more than one TRP, the acquiring unit 202 is configured to acquire report of the beam failure events of the more than one TRP from the UE. The beam failure events for different TRPs are reported independently from each other.

It should be understood that, in a case that one TRP is configured with multiple reference signals and the physical layer beam failure event occurs to beams corresponding to all reference signals of the TRP, it is determined that the physical layer beam failure event occurs to the TRP. Specifically, a first counter is set for each TRP. When each of BLER values of beams corresponding to all reference signals of one TRP is greater than a corresponding BLER threshold, it is determined that the physical layer beam failure event occurs to the TRP and the first counter of the TRP is increased by 1. When a BLER value of beams corresponding to a part of reference signals exceeds a corresponding BLER threshold, the first counter of the TRP is not increased by 1. When the first counter of a TRP reaches the first maximum counting threshold, it is determined that the beam failure event occurs to the TRP.

In addition, as described in the first embodiment, a first counter may be set for each beam of each TRP. The same BLER threshold or different thresholds may be set for multiple beams of one TRP. For example, when the beam failure events occur to all beams of one TRP, it is determined that the beam failure event occurs to the TRP. Alternatively, a relationship between the beam failure events of beams of one TRP and the beam failure event of the TRP may be defined in other manners. For example, the UE may calculate an average of BLERs of beams corresponding to all reference signals of one TRP, and determine whether the beam failure event occurs by taking the average BLER as the BLER of the TRP.

In another aspect, for example, the second configuration may include one or more of the following: a weighting parameter for calculating a joint BLER of multiple TRPs, a joint BLER threshold, a second counter counting the number of times of joint physical layer beam failure for multiple TRP, and a second maximum counting threshold of the second counter.

According to the second configuration, the UE determines the beam failure event based on the joint BLER of the multiple TRPs. In the Multi-TRP scenario, the performance of the UE is determined based on the joint transmission performance of the multiple TRPs. Therefore, determination of beam failure based on the joint BLER can accurately reflect the deterioration of the performance of the UE, thereby improving the reliability.

Similarly, for a case where one TRP is configured with multiple reference signals, a weighting parameter may be set for BLER of a beam corresponding to each reference signal. The UE calculates a weighted sum of BLERs of all beams of all TRPs. In a case that the finally calculated BLER exceeds the joint BLER threshold, it is determined that the joint physical layer beam failure event occurs, that is, an instance of a joint beam failure event is created.

Exemplarily, the base station may configure the UE to operate based on one of the first configuration and the second configuration, or operate by combining the first configuration and the second configuration.

In an example, the base station may determine a type of the transmission scenario, and provide configuration of the beam failure recovery to the UE based on the type of transmission scenario, that is, providing one of the first configuration and the second configuration, or providing both the first configuration and the second configuration. For example, in the eMBB scenario, the base station provides the first configuration to the UE, that is, the configuration information transmitted by the transmitting unit 201 includes the first configuration. In the URLLC scenario, the base station provides the first configuration and the second configuration to the UE, that is, the configuration information transmitted by the transmitting unit 201 includes the first configuration and the second configuration. In the URLLC scenario, the base station provides the second configuration to the UE. That is, the configuration information transmitted by the transmitting unit 201 includes the second configuration.

In another example, the configuration information further includes information indicating the type of transmission scenario. The type of transmission scenario includes one of eMBB and URLLC. The UE determines the configuration to be used based on the type of transmission scenario.

In addition, the acquiring unit 202 is configured to acquire the report of the UE via LRR. In an example, the LRR may have a particular sequence format to indicate that the beam failure event has occurred. The particular sequence format may be an all-zero sequence or all-one sequence, for example. In this case, the acquiring unit 202 is further configured to acquire, via MAC CE from the UE, information indicating the TRP to which the beam failure event has occurred and information of a candidate beam of the TRP to which the beam failure event has occurred.

A CORESETPoolIndex may be used to indicate the TRP to which the beam failure event has occurred. For example, in a case that the joint beam failure has occurred, the acquiring unit 202 receives the particular sequence of all-zero or all-one from the UE, and then receives two CORESETPoolIndexes corresponding to $TRP_0$ and $TRP_1$ and information of respective candidate beams.

In another example, LRR may include information indicating the TRP to which the beam failure event occurs. For example, the CORESETPoolIndex may be used to indicate the TRP to which the beam failure event has occurred. The acquiring unit 202 is further configured to acquire, via MAC CE from the UE, information of the candidate beam of the TRP to which the beam failure event has occurred. The LRR is carried on PUCCH, and the MAC CE is carried on the PUSCH.

For example, in a case that the beam failure event occurs to only $TRP_0$, the acquiring unit 202 acquires, from the UE, the CORESETPoolIndex (for example 0) corresponding to $TRP_0$ carried in the LRR, and then acquires the information of the candidate beam of $TRP_0$ carried on the MAC CE.

In summary, according to the electronic apparatus 200 in the embodiment, a beam failure determination rule and a beam failure event notification mechanism for the Multi-TRP scenario are provided, thereby better ensuring transmission reliability and reducing latency in the Multi-TRP scenario.

Figure 8:
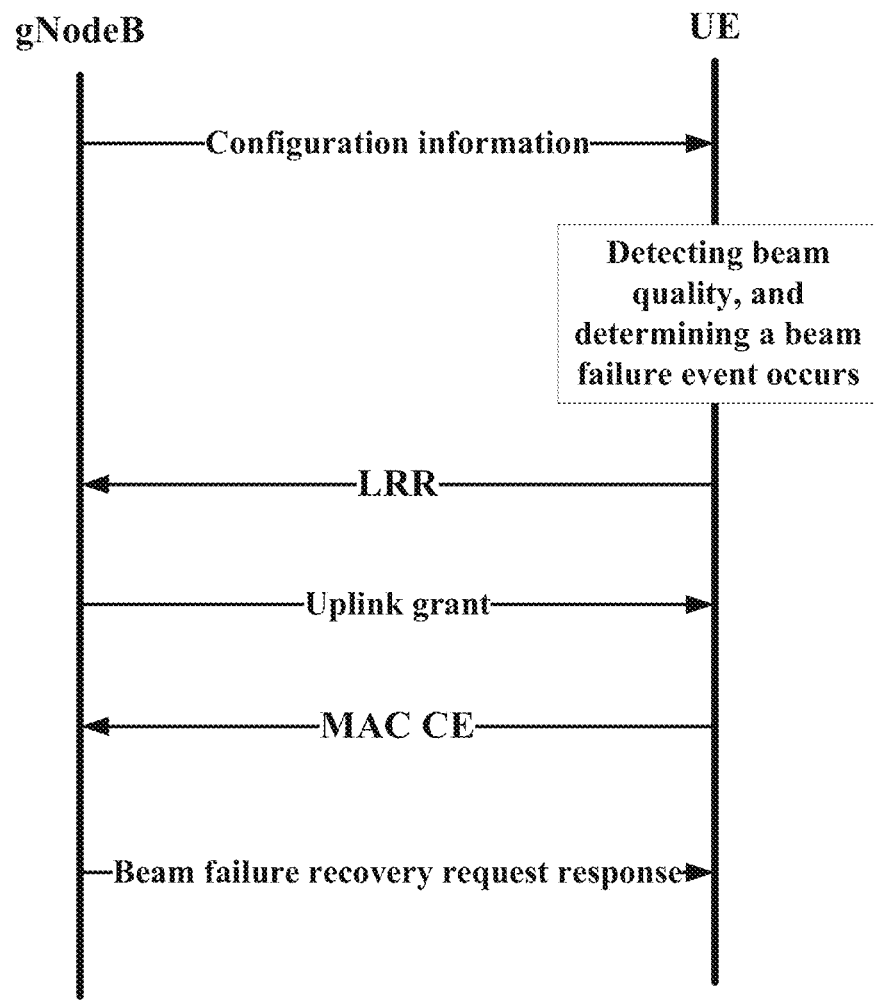
FIG. 8 shows an example of an information procedure between a base station and user equipment.

For facilitating understanding, FIG. 8 shows information procedure of a BFR mechanism between a base station (gNodeB) and user equipment (UE) for a Multi-TRP scenario. As shown in FIG. 8, first, the gNB transmits configuration information for BFR to the base station via RRC signaling, for example. The configuration information may include the first configuration and/or the second configuration, for example various BLER threshold parameters, counters and counter threshold parameters. In addition, the configuration information may further include information indicating a type of transmission scenario. Subsequently, the UE detects a beam quality and determines a beam failure event based on configuration indicated by the configuration information. When it is determined that the beam failure event occurs (a beam failure event for a single TRP or a joint beam failure event), the UE transmits the LRR to the base station on the PUCCH. LRR may be used to indicate that the beam failure event has occurred, for example, indicate this fact by transmitting a particular sequence of all-zero or all-one. The LRR may be further used to transmit information of the TRP to which the beam failure event has occurred, for example the corresponding CORESETPoolIndex. After receiving the LRR, the gNB transmits uplink grant to the UE. The UE transmits MAC CE to the base station on a corresponding PUSCH resource based on the uplink grant. The MAC CE may include information of a candidate beam of the TRP to which the beam failure event occurs. In a case that the LRR includes the particular sequence, the MAC CE may further include the information of the TRP to which the beam failure event has occurred, for example corresponding CORESETPoolIndex.

It should be noted that the information procedure in FIG. 8 is only schematic and is not intended to limit the present disclosure.

Third Embodiment

In the above description of embodiments of the electronic apparatuses for wireless communications, it is apparent that some processing and methods are further disclosed. In the following, a summary of the methods are described without repeating details that are described above. However, it should be noted that although the methods are disclosed when describing the electronic apparatuses for wireless communications, the methods are unnecessary to adopt those components or to be performed by those components described above. For example, implementations of the electronic apparatuses for wireless communications may be partially or completely implemented by hardware and/or firmware. Methods for wireless communications to be discussed blow may be completely implemented by computer executable programs, although these methods may be implemented by the hardware and/or firmware for implementing the electronic apparatuses for wireless communications.

Figure 9:
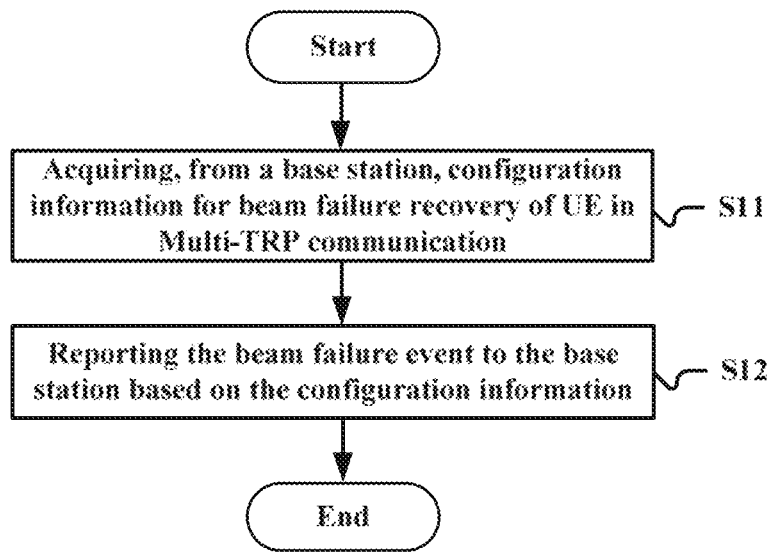
FIG. 9 shows a flowchart of a method for wireless communications according to an embodiment of the present disclosure.

FIG. 9 shows a flowchart of a method for wireless communications according to an embodiment of the present disclosure. The method includes: acquiring, from a base station, configuration information for beam failure recovery of UE in Multi-TRP communication (S11), where the configuration information includes first configuration and/or second configuration, the first configuration is used for determination of a beam failure event for each TRP, and the second configuration is used for joint determination of a beam failure event of the multiple TRPs; and reporting the beam failure event to the base station based on the configuration information (S12). The method may be performed at a UE side.

Exemplarily, the configuration information may further include information indicating a type of transmission scenario. The type of transmission scenario includes one of enhanced mobile broadband and ultra reliable low latency communication. The method may further include, for example, determining to report the beam failure event based on the first configuration and/or the second configuration according to the indicated type of transmission scenario.

Although not shown in the figure, the method may further include the following step: determining that the beam failure event has occurred based on the first configuration and/or the second configuration.

For example, the first configuration may include one or more of the following: a BLER threshold for each TRP, a first counter counting the number of times of physical layer beam failure for each TRP, and a first maximum counting threshold for the first counter. BLER thresholds for respective TRPs may be the same or different; and/or the first maximum counting thresholds of the first counters of respective TRPs may be the same or different. For example, BLER of a beam failure detection reference signal configured for each TRP may be detected as the BLER of the TRP.

The method includes: in response to the first configuration, increasing, in a case that a physical layer beam failure event occurs to one of multiple TRPs, the first counter of the TRP by 1; determining, in a case that a counting value of the first counter reaches the first maximum counting threshold, that the beam failure event occurs to the TRP; and reporting the beam failure event to the base station in step S12. In a case that it is determined that the beam failure events occur to more than one TRP, the beam failure events of the more than one TRP are reported to the base station respectively.

For example, the second configuration includes one or more of the following: a weighting parameter for calculating a joint BLER of multiple TRPs, a joint BLER threshold, a second counter counting the number of times of joint physical layer beam failure for multiple TRPs, and a second maximum counting threshold of the second counter. For example, a weighted sum of BLERs of all of the multiple TRPs may be calculated based on the weighting parameters, and the calculated result is taken as the joint BLER. Exemplarily, the weighting parameter is set for each TRP and is a constant ranging from 0 to 1. A sum of all weighting parameters is 1.

The method includes: in response to the second configuration, increasing, in a case that a joint physical layer beam failure event occurs to the multiple TRPs, the second counter by 1; determining, in a case that a counting value of the second counter reaches the second maximum counting threshold, that the joint beam failure event has occurred to the multiple TRPs and reporting the joint beam failure event to the base station in step S12.

In addition, the first configuration may be used in combination with the second configuration. The method includes: in response to the first configuration and the second configuration, increasing, in a case that a physical layer beam failure event occurs to one of multiple TRPs, the first counter of the TRP by 1: increasing, in a case that a joint physical layer beam failure event occurs to the multiple TRPs, the second counter by 1: determining, in a case that a counting value of any of the multiple first counters reaches the first maximum counting threshold in the first place, that the beam failure event occurs to the TRP corresponding to the first counter, and reporting the beam failure event to the base station; and determining, in a case that a counting value of the second counter reaches the second maximum counting threshold in the first place, that the joint beam failure event occurs to the multiple TRPs and reporting the joint beam failure event to the base station.

For example, in step S12, the beam failure event may be reported to the base station via LRR.

In an example, the LRR may have a particular sequence format to indicate that the beam failure event has occurred. Step S12 may further include: transmitting, via MAC CE to the base station, information indicating the TRP to which the beam failure event has occurred, and information of a candidate beam of the TRP to which the beam failure event has occurred.

In another example, the LRR includes information indicating the TRP to which the beam failure event has occurred. Similarly, A CORESETPoolIndex may be used to indicate the TRP to which the beam failure event has occurred. Step S12 may further include: transmitting, via MAC CE to the base station, information of the candidate beam of the TRP to which the beam failure event has occurred.

Figure 10:
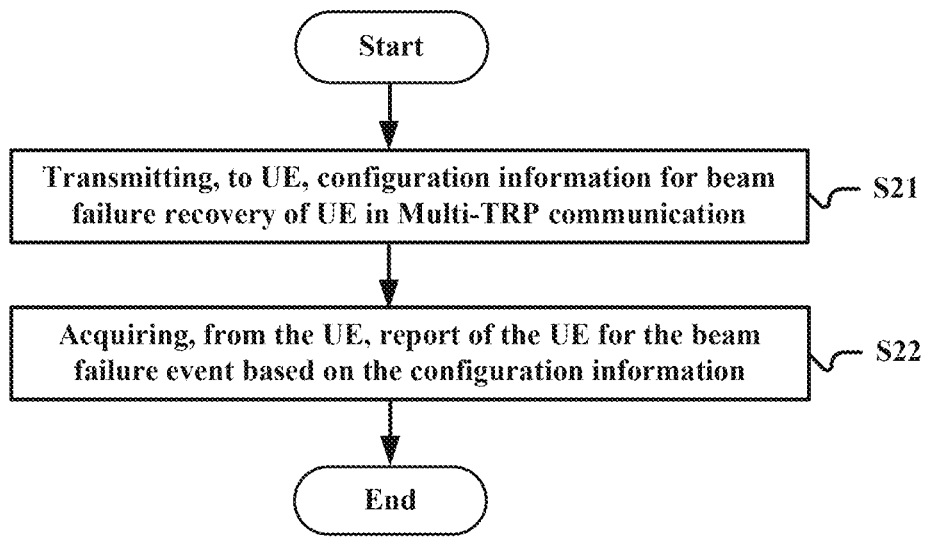
FIG. 10 shows a flowchart of a method for wireless communications according to another embodiment of the present disclosure.

FIG. 10 shows a flowchart of a method for wireless communications according to another embodiment of the present disclosure. The method includes: transmitting configuration information for beam failure recovery of UE in Multi-TRP communication to the UE (S21), where the configuration information includes first configuration and/or second configuration, the first configuration is used for determination of a beam failure event for each of the multiple TRPs, and the second configuration is used for joint determination of a beam failure event of the multiple TRPs; and acquiring, from the UE, report of the UE for the beam failure event based on the configuration information (S22). The method may be performed at a base station side, for example.

Schematically, the configuration information may further include information indicating a type of transmission scenario. The type of transmission scenario includes one of enhanced mobility broadband and ultra reliable low latency communication.

Similarly, the first configuration may include one or more of the following: a BLER threshold for each TRP, a first counter counting the number of times of physical layer beam failure for each TRP, and a first maximum counting threshold for the first counter. BLER thresholds for respective TRPs may be the same or different, and/or first maximum counting thresholds for the first counters of respective TRPs may be the same or different.

In a case that the beam failure events occur to more than one TRP, report of the beam failure events of the more than one TRP is acquired from the UE.

The second configuration may include one or more the following: a weighting parameter for calculating a joint BLER of multiple TRPs, a joint BLER threshold, a second counter counting the number of times of joint physical layer beam failure of the multiple TRPs, and a second maximum counting threshold for the second counter.

In step S22, the report of the beam failure event may be acquired via LRR. In an example, the LRR has a particular sequence format, to indicate that the beam failure event has occurred. Step S22 further includes: acquiring, via MAC CE from the UE, information indicating the TRP to which the beam failure event has occurred and information of a candidate beam of the TRP to which the beam failure event has occurred. The TRP to which the beam failure event has occurred may be indicated by a CORESETPoolIndex. In another example, the LRR may include information indicating the TRP to which the beam failure event has occurred, for example the CORESETPoolIndex of the TRP to which the beam failure event has occurred. Step S22 further includes: acquiring, via MAC CE from the UE, information of the candidate beam of the TRP to which the beam failure event has occurred.

It should be noted that, the above methods may be used in combination or separately. Details are described in detail in the first to second embodiments, and are not repeated herein.

The technology according to the present disclosure may be applied to various products.

For example, the electronic apparatus 200 may be implemented as various types of base stations. The base stations may be implemented as any type of evolved node B (eNB) or gNB (5G base station). The eNB includes a macro eNB and a small eNB, for example. The small eNB may be an eNB such as a pico eNB, a micro eNB and a home (femto) eNB that covers a cell smaller than a macro cell. The situation is similar to the gNB. Alternatively, the base station may also be implemented as a base station of any other type, such as a NodeB and a base transceiver station (BTS). The base station may include a main body (that is also referred to as a base station device) configured to control wireless communications, and one or more remote radio heads (RRH) arranged in a different place from the main body. In addition, various types of user equipment each may operate as the base station by performing functions of the base station temporarily or semi-permanently.

The electronic apparatus 100 may be implemented as various types of user equipment. The user equipment may be implemented as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be implemented as a terminal (that is also referred to as a machine type communication (MTC) terminal) that performs machine-to-machine (M2M) communication. Furthermore, the user equipment may be a wireless communication module (such as an integrated circuit module including a single die) mounted on each of the terminals.

[Application Examples Regarding a Base Station]

First Application Example

Figure 11:
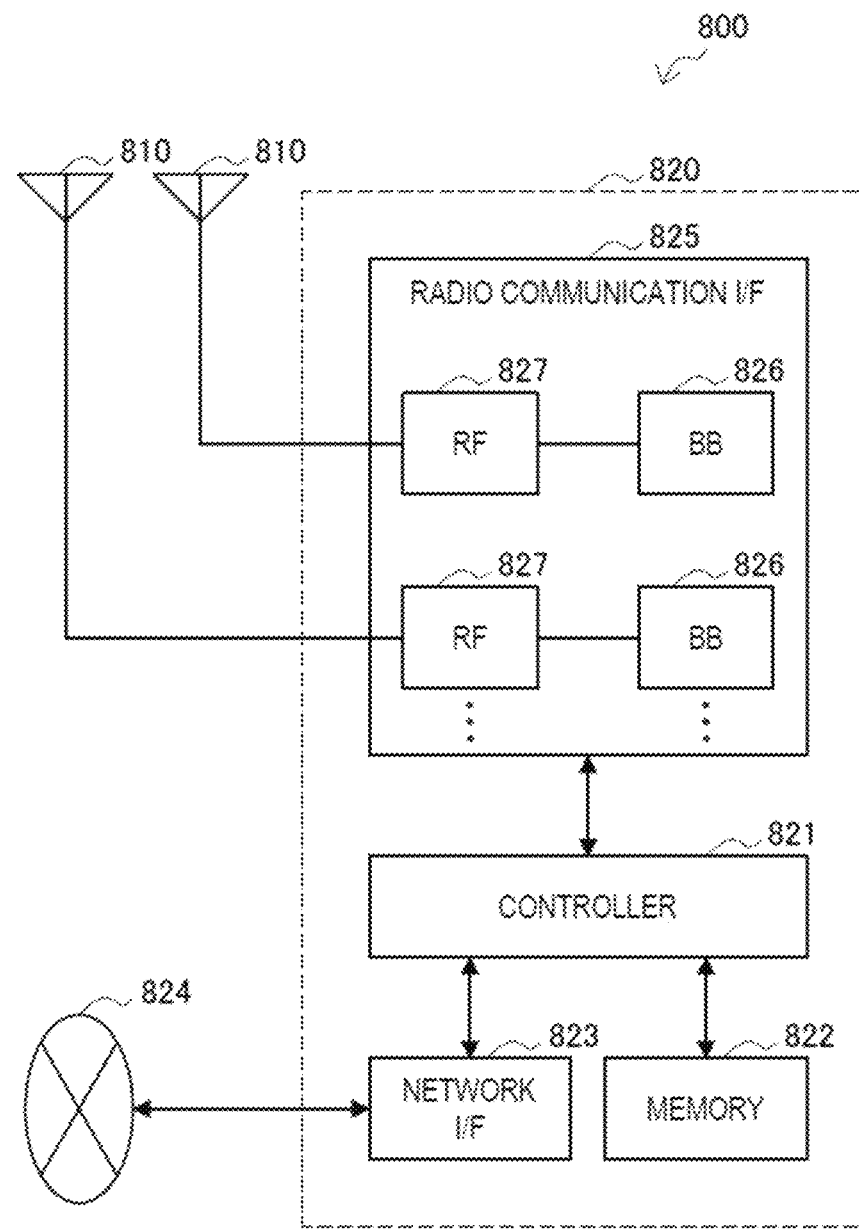
FIG. 11 is a block diagram showing a first example of an exemplary configuration of an eNB or gNB to which the technology of the present disclosure may be applied.

FIG. 11 is a block diagram showing a first example of an exemplary configuration of an eNB or gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 11, the eNB 800 may include the multiple antennas 810. For example, the multiple antennas 810 may be compatible with multiple frequency bands used by the eNB 800. Although FIG. 11 shows the example in which the eNB 800 includes the multiple antennas 810, the eNB 800 may include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as a terminal list, transmission power data and scheduling data).

The network interface 823 is a communication interface for connecting the base station apparatus 820) to a core network 824. The controller 821 may communicate with a core network node or another eNB via the network interface 823. In this case, the eNB 800, and the core network node or another eNB may be connected to each other via a logic interface (such as an SI interface and an X2 interface). The network interface 823 may also be a wired communication interface or a wireless communication interface for wireless backhaul. In a case that the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and perform various types of signal processing of layers (such as L1, Media Access Control (MAC), Radio Link Control (RLC), and a Packet Data Convergence Protocol (PDCP)). The BB processor 826 may have a part or all of the above-described logical functions, to replace the controller 821. The BB processor 826 may be a memory storing communication control programs, or a module including a processor and a related circuit configured to execute the programs. Updating the program may allow the functions of the BB processor 826 to be changed. The module may be a card or a blade inserted into a slot of the base station apparatus 820. Alternatively, the module may be a chip mounted on the card or the blade. Meanwhile, the RF circuit 827 may include, for example, a mixer, a filter, and an amplifier, and transmits and receives wireless signals via the antenna 810.

As shown in FIG. 11, the radio communication interface 825 may include multiple BB processors 826. For example, the multiple BB processors 826 may be compatible with multiple frequency bands used by the eNB 800. The radio communication interface 825 may include multiple RF circuits 827, as shown in FIG. 11. For example, the multiple RF circuits 827 may be compatible with multiple antenna elements. Although FIG. 11 shows the example in which the radio communication interface 825 includes multiple BB processors 826 and multiple RF circuits 827, the radio communication interface 825 may include a single BB processor 826 and a single RF circuit 827.

In the eNB 800 shown in FIG. 11, the transmitting unit 201, the acquiring unit 202 and the transceiver of the electronic apparatus 200 may be implemented by the radio communication interface 825. At least a part of functions may be implemented by the controller 821. For example, the controller 21 can configure the BFR mechanism of the UE for the Multi-TRP scenario and acquire the report of the beam failure event of the UE by executing the functions of the transmitting unit 201 and the acquiring unit 202.

Second Application Example

Figure 12:
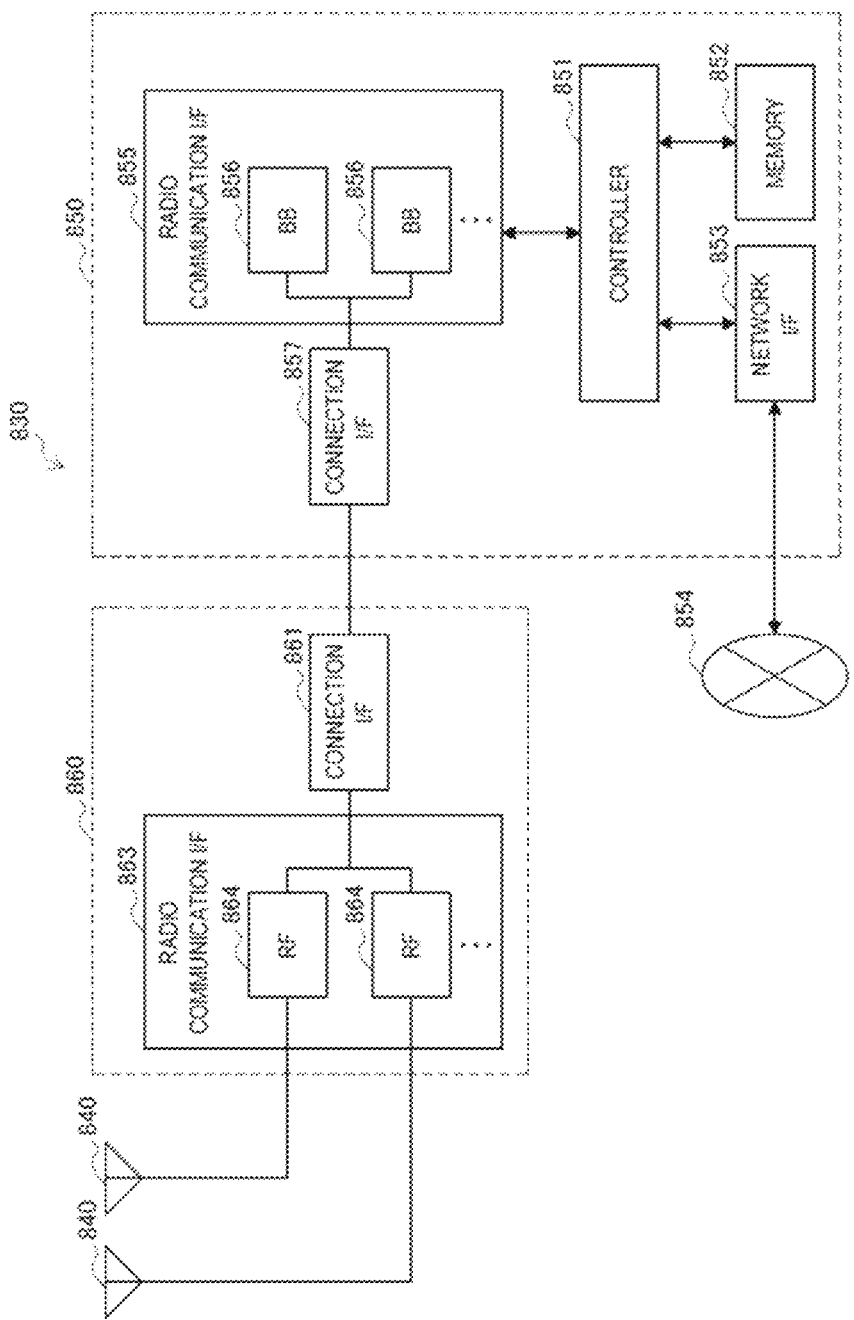
FIG. 12 is a block diagram showing a second example of an exemplary configuration of an eNB or gNB to which the technology of the present disclosure may be applied.

FIG. 12 is a block diagram showing a second example of an exemplary configuration of an eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 12, the eNB 830 may include multiple antennas 840. For example, the multiple antennas 840 may be compatible with multiple frequency bands used by the eNB 830. Although FIG. 12 shows the example in which the eNB 830 includes multiple antennas 840, the eNB 830 may include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 11.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 11, except that the BB processor 856 is connected to an RF circuit 864 of the RRH 860 via the connection interface 857. As show in FIG. 12, the radio communication interface 855 may include multiple BB processors 856. For example, the multiple BB processors 856 may be compatible with multiple frequency bands used by the eNB 830. Although FIG. 12 shows the example in which the radio communication interface 855 includes multiple BB processors 856, the radio communication interface 855 may include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, an RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 12. For example, the multiple RF circuits 864 may support multiple antenna elements. Although FIG. 12 shows the example in which the radio communication interface 863 includes multiple RF circuits 864, the radio communication interface 863 may include a single RF circuit 864.

In the eNB 830 shown in FIG. 12, the transmitting unit 201, the acquiring unit 202 and the transceiver of the electronic apparatus 200 may be implemented by the radio communication interface 855 and/or the radio communication interface 863. At least a part of functions may be implemented by the controller 851. For example, the controller 851 can configure the BFR mechanism of the UE for the Multi-TRP scenario and acquire report of the beam failure event of the UE, by performing functions of the transmitting unit 201 and the acquiring unit 202.

[Application Examples Regarding User Equipment]

First Application Example

Figure 13:
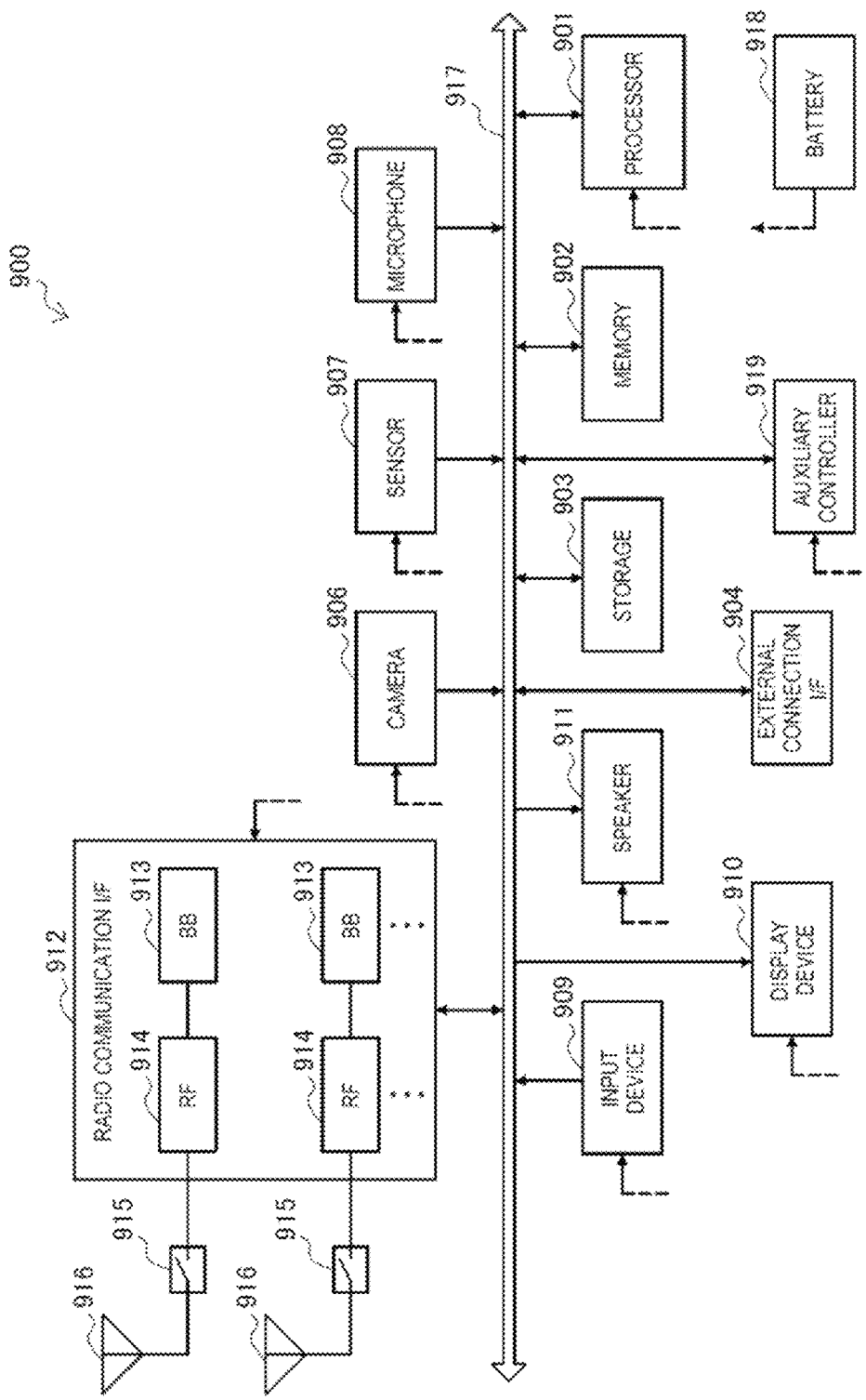
FIG. 13 is a block diagram showing an example of an exemplary configuration of a smartphone to which the technology according to the present disclosure may be applied.

FIG. 13 is a block diagram showing an exemplary configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals outputted from the smartphone 900 to sounds.

The radio communication interface 912 supports any cellular communication scheme (such as LTE and LTE-advanced), and performs wireless communications. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 13 shows a case that one RF link is connected to one antenna, which is only illustrative, and a situation where one RF link is connected to multiple antennas through multiple phase shifters is also possible. The radio communication interface 912 may be a chip module having the BB processor 913 and the RF circuit 914 integrated thereon. The radio communication interface 912 may include multiple BB processors 913 and multiple RF circuits 914, as shown in FIG. 13. Although FIG. 13 shows the example in which the radio communication interface 912 includes multiple BB processors 913 and multiple RF circuits 914, the radio communication interface 912 may include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a wireless local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 13. Although FIG. 13 shows the example in which the smartphone 900 includes multiple antennas 916, the smartphone 900 may include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 shown in FIG. 13 via feeder lines, which are partially shown as dashed lines in FIG. 13. The auxiliary controller 919 operates a minimum necessary function of the smartphone 900, for example, in a sleep mode.

In the smartphone 900 shown in FIG. 13, the acquiring unit 101, the reporting unit 102 and the transceiver of the electronic apparatus 100 may be implemented by the radio communication interface 912. At least a part of functions may be implemented by the processor 901 or the auxiliary controller 919. For example, the processor 901 or the auxiliary controller 919 can determine and report the beam failure event according to the BFR configuration for the Multi-TRP scenario, by performing functions of the acquiring unit 101, the reporting unit 102 and the determining unit 103.

Second Application Example

Figure 14:
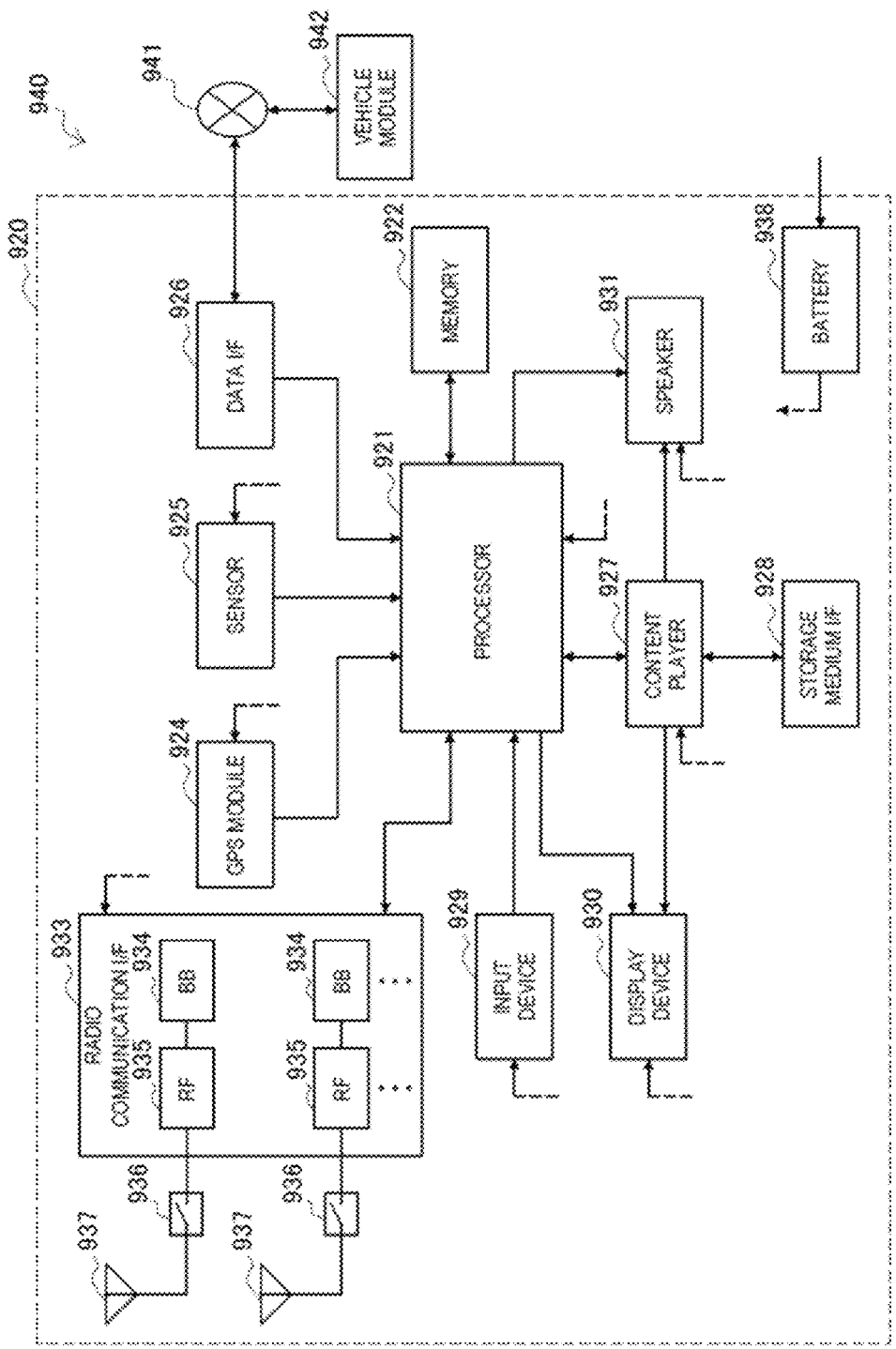
FIG. 14 is a block diagram showing an example of an exemplary configuration of a car navigation apparatus to which the technology according to the present disclosure may be applied.

FIG. 14 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or reproduced content. The speaker 931 outputs a sound for the navigation function or the reproduced content.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 14. Although FIG. 14 shows the example in which the radio communication interface 933 includes multiple BB processors 934 and multiple RF circuits 935, the radio communication interface 933 may include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used for the radio communication interface 933 to transmit and receive wireless signals. As shown in FIG. 14, the car navigation apparatus 920 may include multiple antennas 937. Although FIG. 14 shows the example in which the car navigation apparatus 920 includes multiple antennas 937, the car navigation apparatus 920 may include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 14 via feeder lines that are partially shown as dash lines in FIG. 14. The battery 938 accumulates power supplied from the vehicle.

In the car navigation device 920 shown in FIG. 14, the acquiring unit 101, the reporting unit 102 and the transceiver of the electronic apparatus 100 may be implemented by the radio communication interface 933. At least a part of functions may be implemented by the processor 921. For example, the processor 921 can determine and report the beam failure event according to the BFR configuration for the Multi-TRP scenario, by performing functions of the acquiring unit 101, the reporting unit 102 and the determining unit 103.

The technology according to the present disclosure may also be implemented as an in-vehicle system (or a vehicle) 940 including one or more blocks of the car navigation device 920, the in-vehicle network 941, and a vehicle module 942. The vehicle module 942 generates vehicle data (such as vehicle speed, engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1500 shown in FIG. 15) from a storage medium or network, wherein the computer is capable of implementing various functions when installed with various programs.

Figure 15:
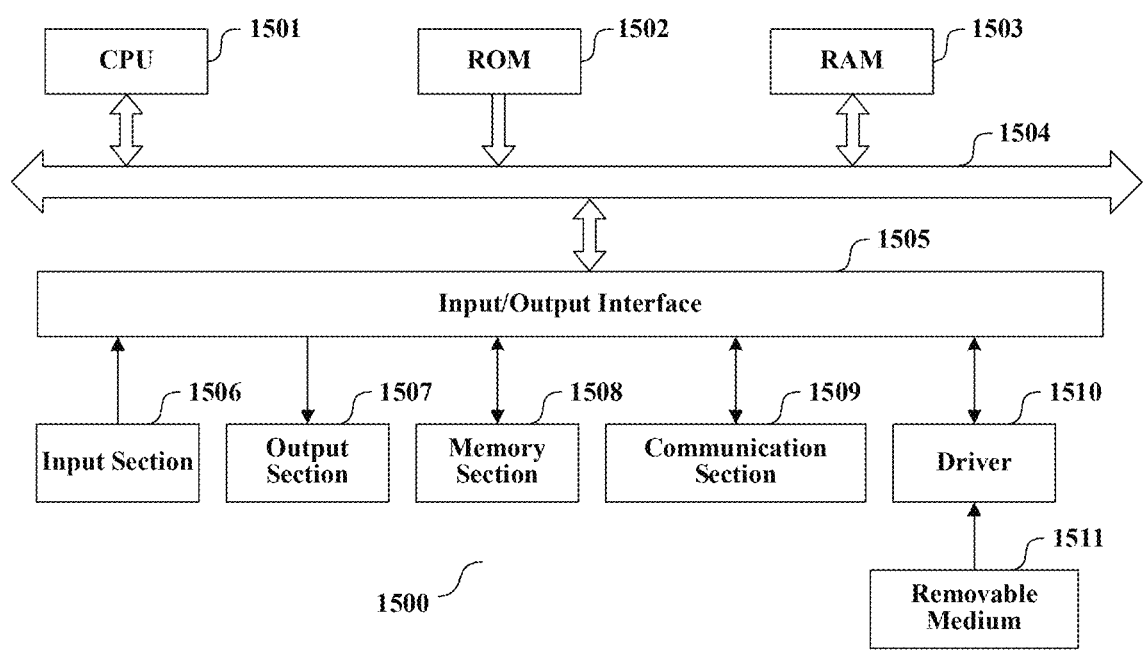
FIG. 15 is a block diagram of an exemplary block diagram illustrating the structure of a general purpose personal computer capable of realizing the method and/or device and/or system according to the embodiments of the present disclosure.

In FIG. 15, a central processing unit (CPU) 1501 executes various processing according to a program stored in a read-only memory (ROM) 1502 or a program loaded to a random access memory (RAM) 1503 from a memory section 1508. The data needed for the various processing of the CPU 1501 may be stored in the RAM 1503 as needed. The CPU 1501, the ROM 1502 and the RAM 1503 are linked with each other via a bus 1504. An input/output interface 1505 is also linked to the bus 1504.

The following components are linked to the input/output interface 1505: an input section 1506 (including keyboard, mouse and the like), an output section 1507 (including displays such as a cathode ray tube (CRT), a liquid crystal display (LCD), a loudspeaker and the like), a memory section 1508 (including hard disc and the like), and a communication section 1509 (including a network interface card such as a LAN card, modem and the like). The communication section 1509 performs communication processing via a network such as the Internet. A driver 1510 may also be linked to the input/output interface 1505, if needed. If needed, a removable medium 1511, for example, a magnetic disc, an optical disc, a magnetic optical disc, a semiconductor memory and the like, may be installed in the driver 1510, so that the computer program read therefrom is installed in the memory section 1508 as appropriate.

In the case where the foregoing series of processing is achieved through software, programs forming the software are installed from a network such as the Internet or a memory medium such as the removable medium 1511.

It should be appreciated by those skilled in the art that the memory medium is not limited to the removable medium 1511 shown in FIG. 15, which has program stored therein and is distributed separately from the apparatus so as to provide the programs to users. The removable medium 1511 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1502 and the memory section 1508 in which programs are stored, and can be distributed to users along with the device in which they are incorporated.

To be further noted, in the apparatus, method and system according to the present disclosure, the respective components or steps can be decomposed and/or recombined. These decompositions and/or re-combinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a (n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
processing circuitry, configured to:
acquire, from a base station, configuration information for beam failure recovery of user equipment (UE) in multiple Transceiving and Receiving Point (multi-TRP) communication,
wherein the configuration information comprises a first configuration and a second configuration, the first configuration being used for determination of a beam failure event of each of multiple TRPs, and the second configuration being used for joint determination of a beam failure event of the multiple TRPs; and
report, based on the configuration information, the beam failure event to the base station,
wherein the first configuration comprises one or more of the following:
a block error rate (BLER) threshold for each TRP,
a first counter counting the number of times of physical layer beam failure for each TRP, and
a first maximum counting threshold of the first counter,
in response to the first configuration, the processing circuitry is configured to:
increase, in a case that the physical layer beam failure event occurs to one of the multiple TRPs, the first counter of the TRP by 1; and
determine, in a case that the counting number of the first counter reaches the first maximum counting threshold, a beam failure event occurs to the TRP, and report the beam failure event to the base station.

2. The electronic apparatus according to claim 1,
wherein the configuration information further comprises information indicating a type of a transmission scenario, and
wherein the type of transmission scenario comprises one of enhanced Mobile Broadband (eMBB) and Ultra Reliable Low Latency Communications (URLLC).

3. The electronic apparatus according to claim 2, wherein the processing circuitry is configured to determine, according to the indicated type of transmission scenario, to perform reporting of the beam failure event based on the first configuration or the second configuration.

4. The electronic apparatus according to claim 1, wherein the processing circuitry is configured to report, in a case that it is determined that beam failure events occur to more than one TRP, to the base station the beam failure events of the more than one TRP respectively.

5. The electronic apparatus according to claim 1, wherein BLER thresholds are same for respective TRPs, or first maximum counting thresholds are same for first counters of respective TRPs.

6. The electronic apparatus according to claim 1, wherein the second configuration comprises one or more of the following:
a weighting parameter for calculating a joint BLER of the multiple TRPs,
a joint BLER threshold, a second counter counting the number of times of joint physical layer beam failure for the multiple TRPs, and
a second maximum counting threshold of the second counter,
in response to the second configuration, the processing circuitry is configured to;
increase, in a case that the joint physical layer beam failure event occurs to the multiple TRPs, the second counter by 1; and determine, in a case that the counting number of the second counter reaches the second maximum counting threshold, that a joint beam failure event occurs to the multiple TRPs, and report the joint beam failure event to the base station.

7. The electronic apparatus according to claim 6,
wherein the processing circuitry is configured to calculate a weighted sum of BLERs of the respective TRPs based on the weighting parameter, and use the calculated weighted sum as the joint BLER, and
wherein the weighting parameter is set for each TRP and is a constant ranging from 0 to 1, and a sum of all the weighting parameters is 1.

8. The electronic apparatus according to claim 1, wherein the processing circuitry is configured to detect the BLER of a beam failure detection reference signal configured for each TRP, as the BLER of the TRP.

9. The electronic apparatus according to claim 1, wherein the processing circuitry is configured to report the beam failure event to the base station via a link recovery request (LRR).

10. The electronic apparatus according to claim 8,
wherein the LRR has a particular sequence format, to indicate that the beam failure event has occurred; and
wherein the processing circuitry is further configured to transmit, via a medium access control-control element (MAC-CE), information indicating the TRP to which the beam failure event has occurred to the base station and information indicating a candidate beam of the TRP to which the beam failure event has occurred.

11. The electronic apparatus according to claim 10, wherein the processing circuitry is configured to indicate the TRP to which the beam failure event has occurred with a control resource set pool index (CORESETPoolIndex).

12. The electronic apparatus according to claim 9, wherein the LRR comprises the information indicating the TRP to which the beam failure event has occurred.

13. The electronic apparatus according to claim 12,
wherein the processing circuitry is configured to indicate the TRP to which the beam failure event has occurred with a CORESETPoolIndex; and
the processing circuitry is further configured to transmit, via a medium access control-control element (MAC-CE), information of a candidate beam of the TRP to which the beam failure event has occurred, to the base station.

14. An electronic apparatus for wireless communications, comprising:
processing circuitry, configured to:
transmit, to user equipment (UE), configuration information for beam failure recovery of the UE in multiple Transceiving and Receiving Point (multi-TRP) communication, wherein the configuration information comprises first configuration or second configuration, the first configuration being used for determination of a beam failure event of each of multiple TRPs, and the second configuration being used for joint determination of a beam failure event of the multiple TRPs; and
acquire, from the UE, report of the UE for a beam failure event based on the configuration information, wherein
the first configuration comprises one or more of the following:
a block error rate (BLER) threshold for each TRP,
a first counter counting the number of times of physical layer beam failure for each TRP, and
a first maximum counting threshold of the first counter; and
the second configuration comprises one or more of the following:
a weighting parameter for calculating a joint BLER of the multiple TRPs,
a joint BLER threshold, a second counter counting the number of times of joint physical layer beam failure of the multiple TRPs, and
a second maximum counting threshold for the second counter.

15. The electronic apparatus according to claim 14, wherein the processing circuitry is configured to acquire, in a case that beam failure events occur to more than one TRP, report of the beam failure events of the more than one TRP from the UE.

16. The electronic apparatus according to claim 14, the processing circuitry is configured to obtain the report via link recovery request (LRR).

17. A method for wireless communications, the method performed by an electronic apparatus and comprising:
acquiring, from a base station, configuration information for beam failure recovery of user equipment (UE) in multiple Transceiving and Receiving Point (multi-TRP) communication,
wherein the configuration information comprises first configuration and second configuration, the first configuration being used for determination of a beam failure event of each of multiple TRPs, and the second configuration being used for joint determination of a beam failure event of the multiple TRPs; and
reporting, based on the configuration information, the beam failure event to the base station,
wherein the first configuration comprises one or more of the following:
a block error rate (BLER) threshold for each TRP,
a first counter counting the number of times of physical layer beam failure for each TRP, and
a first maximum counting threshold of the first counter,
in response to the first configuration, the method further comprises:
increasing, in a case that the physical layer beam failure event occurs to one of the multiple TRPs, the first counter of the TRP by 1; and
determining, in a case that the counting number of the first counter reaches the first maximum counting threshold, a beam failure event occurs to the TRP, and reporting the beam failure event to the base station.

* * * * *